(12) United States Patent
Conyers (10) Patent No.: US 12,457,513 B2
(45) Date of Patent: Oct. 28, 2025

(54) EVENT BASED NETWORK DOWNTIME DETERMINATION

(71) Applicant: DISH Wireless L.L.C., Englewood, CO (US)

(72) Inventor: Jeremy Conyers, Denver, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 456 days.

(21) Appl. No.: 18/069,094

(22) Filed: Dec. 20, 2022

(65) Prior Publication Data

US 2024/0205702 A1    Jun. 20, 2024

(51) Int. Cl.
*H04W 24/08*       (2009.01)
*H04L 43/0805*   (2022.01)
*H04W 24/04*       (2009.01)

(52) U.S. Cl.
CPC ......... *H04W 24/08* (2013.01); *H04L 43/0805* (2013.01); *H04W 24/04* (2013.01)

(58) Field of Classification Search
CPC .... H04W 24/08; H04W 24/04; H04L 43/0805
See application file for complete search history.

(56) References Cited

U.S. PATENT DOCUMENTS

| | | | |
|---|---|---|---|
| 8,341,106 B1* | 12/2012 | Scolnicov | G06N 7/01 |
| | | | 702/50 |
| 10,405,223 B1* | 9/2019 | Douberley | H04W 24/10 |
| 11,522,747 B1* | 12/2022 | Segler | H04L 41/0627 |
| 2017/0134240 A1* | 5/2017 | Hévizi | H04L 41/0618 |
| 2020/0177459 A1* | 6/2020 | Berman | H04L 43/10 |
| 2021/0112405 A1* | 4/2021 | Li | H04W 24/04 |

OTHER PUBLICATIONS

Dgtl Infra, Infra-Cell Tower Locations_ How to Find 4G LTE and 5G Towers—Oct. 16, 202 (Year: 2022).*

* cited by examiner

*Primary Examiner* — Brian J. Gillis
*Assistant Examiner* — Chhian (Amy) Ling
(74) *Attorney, Agent, or Firm* — Seed Intellectual Property Law Group LLP (57) ABSTRACT

Network downtime determination and reporting technologies are disclosed. An example method for determining downtime associated with a communications network includes detecting an event that triggers update of a downtime accumulation estimate associated with the communications network, and determining real-time status of a subset of cell sites that is potentially affected by the event. The example method also includes updating the downtime accumulation estimate based on the real-time status of the subset, and comparing the updated downtime accumulation estimate with one or more criteria for reporting the same.

18 Claims, 4 Drawing Sheets

EVENT BASED NETWORK DOWNTIME DETERMINATION

BACKGROUND

In telecommunications, 5G is the fifth-generation technology standard for broadband cellular networks. 5G networks are cellular networks, in which the service area is divided into small geographical areas called cells. 5G wireless devices in a cell can communicate by radio waves with a cellular base station (e.g., located on a cellular tower) via fixed antennas, over frequency channels. The base stations can be connected to switching centers in the telephone network and routers for Internet access by high-bandwidth optical fiber or wireless backhaul connections.

Network outage or other malfunction can cause downtime, which can have significant impact on cellular network users. There is a need for efficient assessment and determination of network downtime, which forms the basis for proper reporting and remedying.

BRIEF SUMMARY

Network downtime typically refers to the inaccessibility of a communications network due, e.g., to the failure of a particular system, application, cell site, or the entire network. Downtime could occur due to maintenance activities, power cuts, unexpected technical failures, or various other reasons. The negative impact of such interruption may vary for different network users. The timely and efficient determining of downtime can serve as an important basis for impact measuring and remediation.

In accordance with some embodiments, the present disclosure provides a computer-implemented method for determining downtime associated with a communications network including a plurality of cell sites. The method includes detecting an event that triggers update of a downtime accumulation estimate associated with the communications network, determining real-time status of a subset of the plurality of cell sites that is potentially affected by the event, updating the downtime accumulation estimate based, at least in part, on the real-time status of the subset, comparing the updated downtime accumulation estimate with one or more reporting criteria, and responsive to a positive result from the comparing, transmitting the updated downtime accumulation estimate to a remote system.

In some embodiments, detecting the event comprises obtaining at least one of cell site malfunction messages or user device malfunction messages from the communications network. In some embodiments, detecting the event further comprises determining that a quantity of the at least one of cell site malfunction messages or user device malfunction messages exceeds a threshold. In some embodiments, the threshold is based on at least one of a geographic concentration, network topology-based concentration, or communication market division of the communications network. In some embodiments, the quantity is determined in real-time based, at least in part, on a period of time up to the current moment.

In some embodiments, detecting the event is based, at least in part, on data obtained external to the communications network. In some embodiments, the data obtained external to the communications network includes at least one of power outage alert, fire alert, severe weather alert, or natural disaster alert.

In some embodiments, the method further includes identifying the subset of the plurality of cell sites based, at least in part, on a measure of proximity to the event. In some embodiments, the proximity is based on at least one of a spatial distance or network distance.

In some embodiments, determining the real-time status of the subset of the plurality of cell sites comprises causing active probing of at least one cell site of the subset.

In accordance with some embodiments, a network downtime determination system includes at least one memory that stores computer executable instructions and at least one processor that executes the computer executable instructions to cause actions to be performed. The actions include detecting an event that triggers update of a downtime accumulation estimate associated with a communications network including a plurality of cell sites, determining real-time status of a subset of the plurality of cell sites that is potentially affected by the event, updating the downtime accumulation estimate based, at least in part, on the real-time status of the subset, comparing the updated downtime accumulation estimate with one or more reporting criteria, and responsive to a positive result from the comparing, transmitting the updated downtime accumulation estimate to a remote system.

In some embodiments, the actions further include determining real-time status of all of the plurality of cell sites. In some embodiments, the determining of real-time status of all of the plurality of cell sites is performed independently from the determining of real-time status of the subset of cell sites. In some embodiments, the actions further comprise consolidating the real-time status of all of the plurality of cell sites with the downtime accumulation estimate to determine updated downtime accumulation. In some embodiments, the actions further comprise comparing the updated downtime accumulation with the one or more reporting criteria. In some embodiments, the actions further comprise responsive to a positive result from the comparing of the updated downtime accumulation with the one or more criteria, transmitting the updated downtime accumulation to the remote system.

In accordance with some embodiments, a non-transitory computer-readable medium stores contents that, when executed by one or more processors, cause the one or more processors to perform actions. The actions include detecting an event that triggers update of a downtime accumulation estimate associated with a communications network including a plurality of cell sites, determining real-time status of a subset of the plurality of cell sites that is potentially affected by the event, updating the downtime accumulation estimate based, at least in part, on the real-time status of the subset, comparing the updated downtime accumulation estimate with one or more reporting criteria, and responsive to a positive result from the comparing, causing transmitting of the updated downtime accumulation estimate to a remote system.

In some embodiments, detecting the event is based on at least one of a geographic concentration, network topology-based concentration, or communication market division of the communications network. In some embodiments, detecting the event is based, at least in part, on a period of time up to the current moment.

In some embodiments, the actions further include determining real-time status of all of the plurality of cell sites independently from the determining of real-time status of the subset of cell sites, consolidating the real-time status of all of the plurality of cell sites with the downtime accumulation estimate to determine updated downtime accumulation, comparing the updated downtime accumulation with the one or more reporting criteria, and responsive to a positive result from the comparing of the updated downtime accumulation with the one or more criteria, causing transmitting of the updated downtime accumulation to the remote system.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

Figure 1:
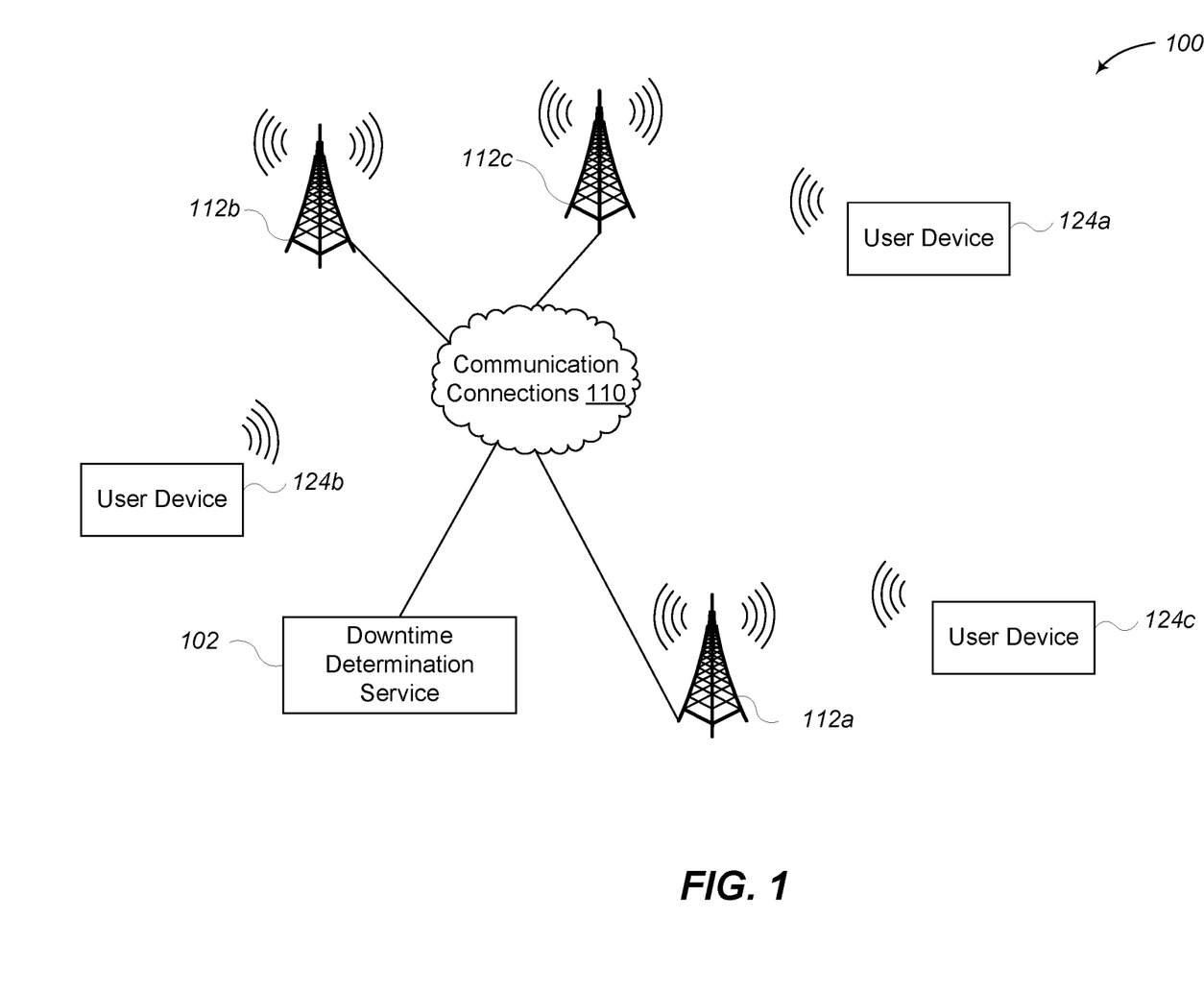
FIG. 1 is a block diagram illustrating an example networked environment for network downtime determination in accordance with some embodiments of the techniques described herein.

FIG. 1 is a block diagram illustrating an example networked environment 100 for network downtime determination in accordance with some embodiments of the techniques described herein. Environment 100 includes a plurality of cells 112a-112c, a plurality of user devices 124a-124b, a downtime determination service 102, and communication connections 110. Illustratively, the cells 112a-112c correspond to cell sites (e.g., cellular towers) that together implement a 5G cellular communications network. The cells 112a-112c may include or be in communication with base stations, radio back haul equipment, antennas, or other devices, which are not illustrated for ease of discussion.

Each cell 112 provides 5G compatible cellular communications over a coverage area. The coverage area of each cell 112 may vary depending on the elevation antenna of the cell, the height of the antenna of the cell above the ground, the electrical tilt of the antenna, the transmit power utilized by the cell, or other capabilities that can be different from one type of cell to another or from one type of hardware to another. Although embodiments are directed to 5G cellular communications, embodiments are not so limited and other types of cellular communications technology may also be utilized or implemented. In various embodiments, the cells 112a-112c may communicate with each other via communication connections 110. Communication connections 110 include one or more wired or wireless networks, which may include a series of smaller or private connected networks that carry information between the cells 112a-112c.

The user devices 124a-124c are computing devices that receive and transmit cellular communication messages or other data with the cells 112a-112c, e.g., via antennas or other means. Examples of user devices 124a-124c may include, but are not limited to, mobile devices, smartphones, tablets, cellular-enabled laptop computers, or other UE (user equipment) or computing devices that can communicate with a 5G cellular network.

In various embodiments, the downtime determination service 102 can include one or more computing devices for performing the downtime determination functions described herein. In some embodiments, the downtime determination service 102 interfaces or otherwise communicates with one or more elements of the 5G network core via the communication connections 110. Some of those interfaces may be standard. The interface to the core element(s) may be direct or may leverage an external API or other gateway. In some embodiments, the downtime determination service 102 can interface or otherwise communicate with cell sites (e.g., cellular towers or controllers thereof), or with systems or devices external to the 5G network. In some embodiments, the downtime determination service 102 is partly or entirely implemented within the 5G network core. In some embodiments, the downtime termination service 102 is at least partly implemented by one or more of the cells 112a-112c.

The above description of the exemplary networked environment 100 and the various services, systems, networks, and devices therein is intended as a broad, non-limiting overview of an example environment in which various embodiments of the presently disclosed technologies may be implemented. FIG. 1 illustrates just one example of an operating environment, and the various embodiments discussed herein are not limited to such an environment. In particular, the networked environment 100 may contain other devices, systems, or media not specifically described herein.

Figure 2:
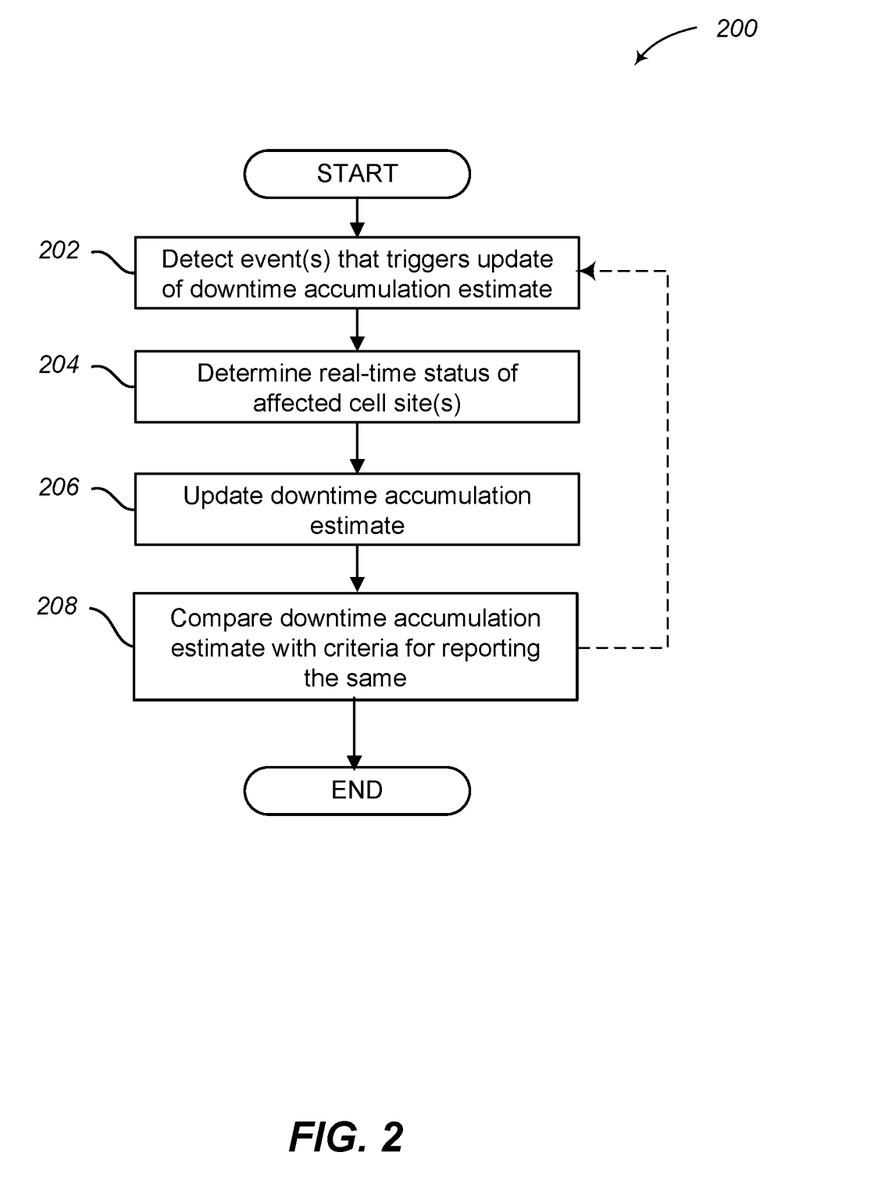
FIG. 2 is a flow diagram depicting an example process for event based network downtime determination in accordance with some embodiments of the techniques described herein.

FIG. 2 is a flow diagram depicting an example process 200 for event based network downtime determination in accordance with some embodiments of the techniques described herein. In various embodiments, the process 200 is performed in real time, and at least some part of the process 200 is performed in a transparent manner to a user of the user device. Illustratively, at least some part of the process 200 can be implemented by the downtime determination service 102 of FIG. 1.

The process 200 starts at block 202, which includes detecting at least an event that triggers update of a downtime accumulation estimate for a communications network (e.g., a 5G cellular network) or a subdivision thereof (e.g., a specific neighborhood, geography, carrier, market, or the like). In some embodiments, detecting the event can include obtaining cell site malfunction messages, user device malfunction messages, or other communication anomaly messages that are exchanged, relayed, or otherwise communicated from the communications network. The quantity of such messages can be compared with a predetermined or dynamically-generated threshold. The event is detected if the quantity of the messages exceeds the threshold.

In some embodiments, the threshold is determined based on a measure of geographic concentration (e.g., lower threshold for lower density of users in a geographic area, higher threshold for higher density of users in a geographic area, or the like), network topology-based concentration (e.g., lower threshold for lower density of users served by certain portion of the network, higher threshold for higher density of users served by certain portion of the network, etc.), or communication market division (e.g., different thresholds for different priorities of service or users) of the communications network. In some embodiments, the quantity of the messages is determined in real-time to include all relevant messages within a period of time up to the current moment. In some embodiments, the threshold can be selected or otherwise specified by a network administrator, developer, or other controlling party.

Alternatively or in addition, the detecting of the event can be based on messages or other data obtained external to the communications network (e.g., by real-time interfacing or otherwise communicating with third party services that are independent from the network). Such data can include power outage alerts, fire alerts, severe weather alerts, natural disaster alerts, or the like. Different thresholds can be applied on such data in the detection of the event.

At block 204, the process 200 includes determining real-time status of one or more cell sites of the communications network that are potentially affected by the event. In some embodiments, the potentially affected cell site(s) is identified based on a proximity to the event. The proximity can be measured based on spatial distance (e.g., a physical distance between a cell site and a location of the event) or network distance (e.g., a number of network relays or hops between a cell site and a network location of the event). A predetermined or dynamically-generated proximity threshold can be applied, and any cell site whose proximity to the event is smaller than the threshold is identified as a potentially affected cell site.

In some embodiments, the determining of the real-time status can be achieved by actively probing of the cell site(s) to obtain operation status, operation history, anomaly history, combination of the same or the like. Based on the obtained real-time status, downtime or outage associated with each identified cell site can be calculated. Alternatively or in addition, the determining of the real-time status can be based on communications with network core element(s) that controls or monitors the cell site(s).

At block 206, the process 200 includes updating the downtime accumulation estimate. For each identified cell site, the most recent downtime or any downtime that has not been accounted for since a prior update is determined. A total quantity of such downtime associated with all of the identified cell sites is calculated and added to the current downtime accumulation estimate. This approach can efficiently and timely capture the abrupt or major spikes of downtime associated with the communications network, while using limited computational and communication resources.

At block 208, the process 200 includes comparing the updated downtime accumulation estimate with one or more criteria for reporting the same. Various legal requirements (e.g., Federal Communications Commission (FCC) requirements), industrial practices, or private requirements may indicate the criteria for reporting network downtime. The updated downtime accumulation estimate can be compared with the criteria, and responsive to a positive result (e.g., the downtime accumulation estimate exceeds an applicable threshold), the process 200 further includes transmitting the downtime accumulation estimate to a remote system for further processing (e.g., to serve as a basis for remediation or other operational changes). In some embodiments, the process 200 includes resetting the downtime accumulation estimate (e.g., to 0) and proceeding back to block 202 to detect another event.

Figure 3:
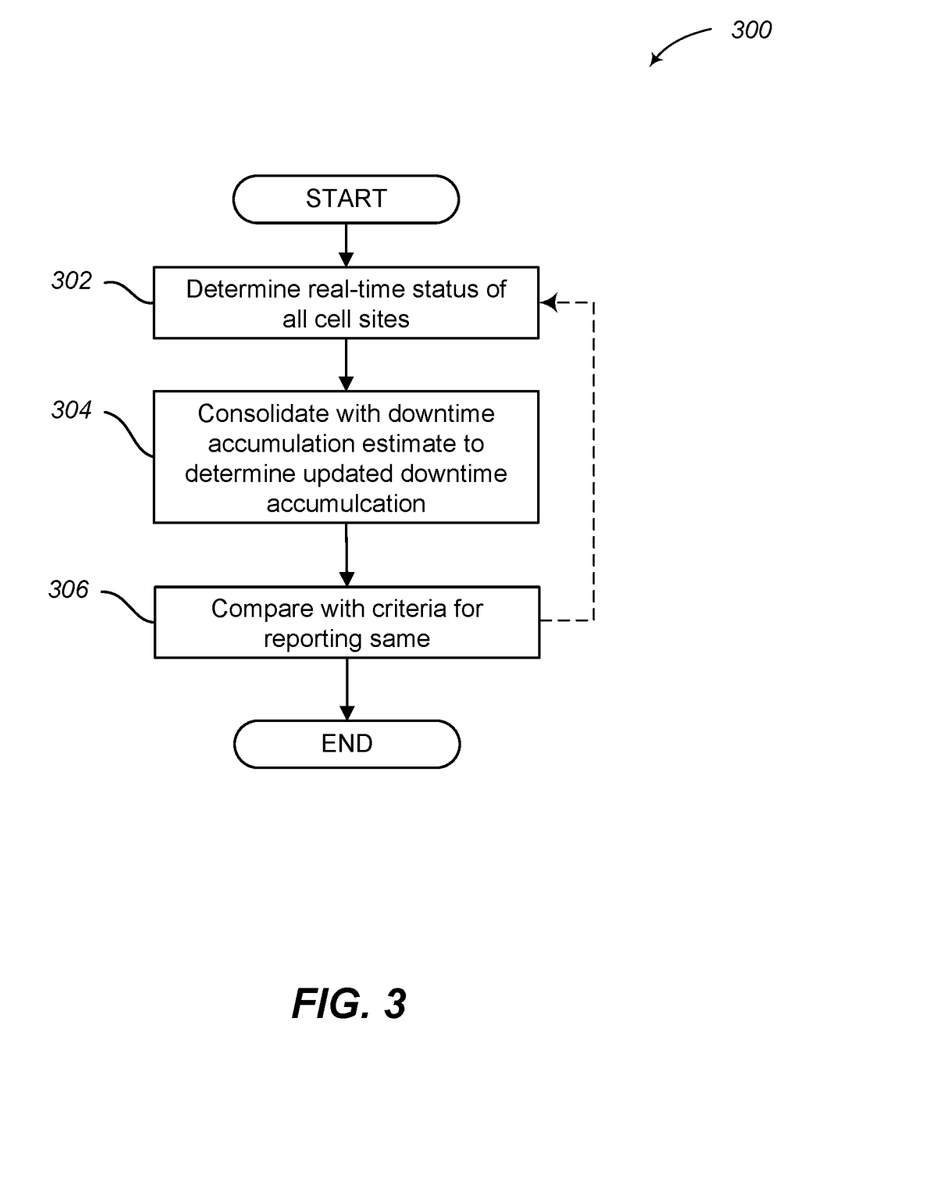
FIG. 3 is a flow diagram depicting an example process for determining a downtime accumulation of a communications network in accordance with some embodiments of the techniques described herein.

FIG. 3 is a flow diagram depicting an example process 300 for determining a downtime accumulation of a communications network in accordance with some embodiments of the techniques described herein. In various embodiments, the process 300 is performed in real time, and at least some part of the process 300 is performed in a transparent manner to a user of the user device. Illustratively, at least some part of the process 300 can be implemented by the downtime determination service 102 of FIG. 1, and can be performed independently, in parallel, or as a supplement to the process 200 in FIG. 2.

The process 300 starts at block 302, which includes determining real-time status of all cell sites of a communications network (e.g., the communications network described in the context of process 200). Because the amount of computation and communication resources required for a global operation on the network is very high, this action can be performed periodically (e.g., once a day), in a staggered manner (e.g., one portion of the network at a time), or after the downtime accumulation estimate is updated a number (predetermined or dynamically-generated) of times in accordance with the process 200. In some embodiments, the determining of real-time status of all the cell sites in process 300 is performed independently from the determining of real-time status of the cell site(s) potentially affected by event(s) in process 200.

At block 304, the process 300 includes consolidating the real-time status of all the cell sites with the current downtime accumulation estimate (e.g., as determined in process 200) to determine an updated downtime accumulation. Because the process 200 is primarily aimed at efficiently and timely capturing the spikes in downtime, it may not have accounted for all the occurrences of downtime associated with every cell site. By examining the real-time status of all cell sites and consolidating with the current downtime accumulation estimate (e.g., by adding any downtime that has not been accounted for by the downtime accumulation estimate, since a prior consolidation), an up-to-date and accurate downtime accumulation is obtained.

At block 306, the process 300 includes comparing the updated downtime accumulation with one or more reporting criteria, which may or may not be the same as used in process 200. Responsive to a positive result (e.g., the downtime accumulation exceeds an applicable threshold), the process 300 further includes transmitting the downtime accumulation to a remote system (which may or may not be the same remote system as in process 200) for further processing (e.g., to serve as a basis for remediation or other operational changes). In some embodiments, the process 300 includes resetting the downtime accumulation (e.g., to 0) and proceeding back to block 302.

The various operations depicted via FIGS. 2 and 3, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 4:
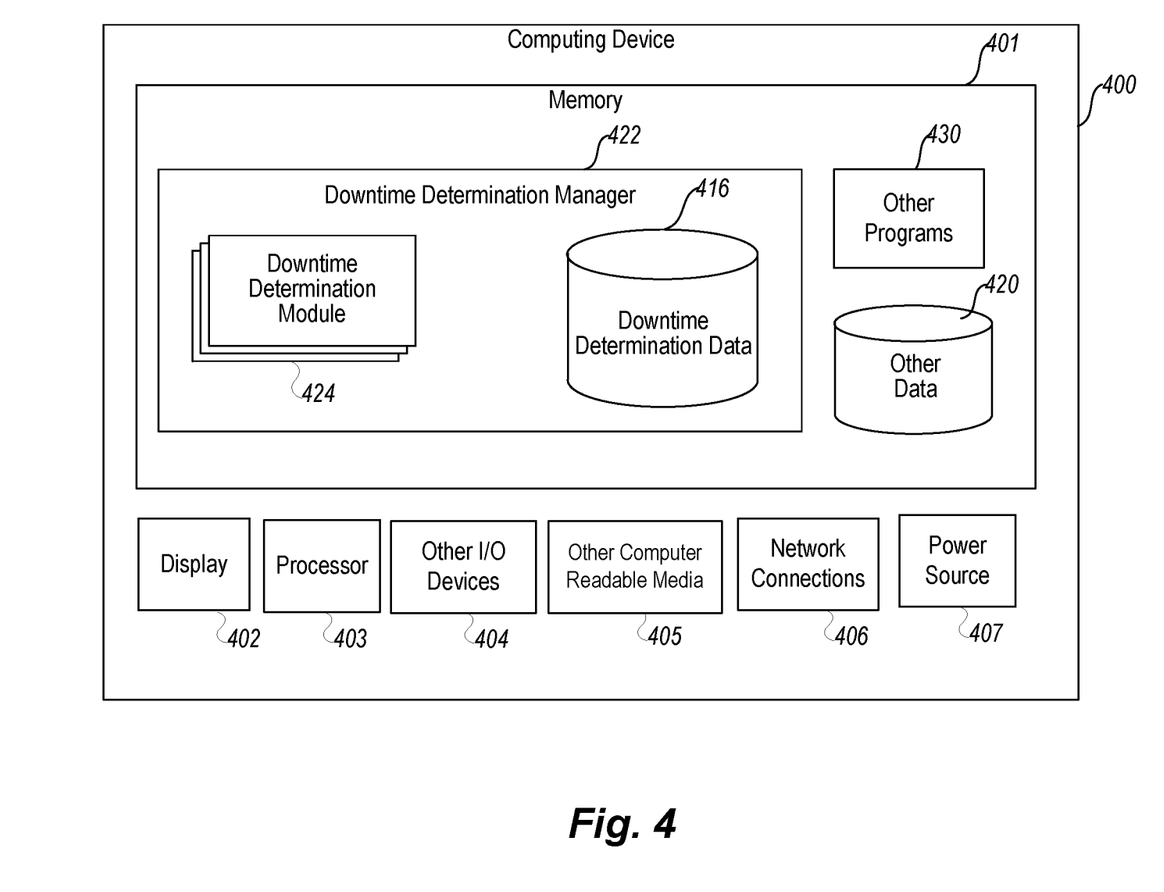
FIG. 4 is a block diagram illustrating elements of an example computing device utilized in accordance with some embodiments of the techniques described herein.

FIG. 4 is a block diagram illustrating elements of an example computing device 400 utilized in accordance with some embodiments of the techniques described herein. Illustratively, the computing device 400 corresponds to a downtime determination service 102, an element or component of communication connections 110, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the downtime determination manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units (CPU) or other processors 403, Input/Output (I/O) devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The downtime determination manager 422 is shown residing in memory 401. In other embodiments, some portion of the contents and some, or all, of the components of the downtime determination manager 422 may be stored on and/or transmitted over the other computer-readable media 405. The components of the computing device 400 and downtime determination manager 422 can execute on one or more processors 403 and implement applicable functions described herein. In some embodiments, the downtime determination manager 422 may operate as, be part of, or work in conjunction and/or cooperation with other software applications stored in memory 401 or on various other computing devices. In some embodiments, the downtime determination manager 422 also facilitates communication with peripheral devices via the I/O devices 404, or with another device or system via the network connections 406.

The one or more downtime determination modules 424 is configured to perform actions related, directly or indirectly, to network downtime determining and reporting as described herein. In some embodiments, the downtime determination module(s) 424 stores, retrieves, or otherwise accesses at least some downtime determination-related data on some portion of the downtime determination data storage 416 or other data storage internal or external to the computing device 400. In various embodiments, at least some of the downtime determination modules 424 may be implemented in software or hardware.

Other code or programs 430 (e.g., further data processing modules, communication modules, a Web server, and the like), and potentially other data repositories, such as data repository 420 for storing other data, may also reside in the memory 401, and can execute on one or more processors 403. Of note, one or more of the components in FIG. 4 may or may not be present in any specific implementation. For example, some embodiments may not provide other computer readable media 405 or a display 402.

In some embodiments, the computing device 400 and downtime determination 422 include API(s) that provides programmatic access to add, remove, or change one or more functions of the computing device 400. In some embodiments, components/modules of the computing device 400 and downtime determination manager 422 are implemented using standard programming techniques. For example, the downtime determination manager 422 may be implemented as an executable running on the processor(s) 403, along with one or more static or dynamic libraries. In other embodiments, the computing device 400 and downtime determination manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the downtime determination manager 422. In some embodiments, instructions cause the one or more processors 403 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a downtime determination manager 422 implementation. Also, other functions could be implemented and/or performed by each component/module, and in different orders, and by different components/modules, yet still achieve the functions of the computing device 400 and downtime determination manager 422.

In addition, programming interfaces to the data stored as part of the computing device 400 and downtime determination manager 422, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The downtime determination data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the downtime determination manager 422.

Furthermore, in some embodiments, some or all of the components of the computing device 400 and downtime determination manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for determining and reporting accumulated downtime associated with a cellular communications network including a plurality of cell sites, the method comprising:
  detecting an event that triggers update of a downtime accumulation estimate associated with the cellular communications network, based on a quantity of malfunction messages exchanged or relayed via the cellular communications network during a period of time up to a current moment;
  identifying a subset of the plurality of cell sites that is potentially affected by the event based, at least in part, on a measure of proximity to the event, wherein the proximity is based on at least one of a spatial distance or network distance;
  determining real-time status of the subset of the plurality of cell sites that is potentially affected by the event;
  updating the downtime accumulation estimate based, at least in part, on the real-time status of the subset;
  comparing the updated downtime accumulation estimate with one or more reporting criteria; and
  responsive to a positive result from the comparing, transmitting the updated downtime accumulation estimate to a remote system and resetting the downtime accumulation estimate.

2. The method of claim 1, wherein detecting the event comprises obtaining at least one of cell site malfunction messages or user device malfunction messages from the communications network.

3. The method of claim 2, wherein detecting the event further comprises determining that a quantity of the at least one of cell site malfunction messages or user device malfunction messages exceeds a threshold.

4. The method of claim 3, wherein the threshold is based on at least one of a geographic concentration, network topology-based concentration, or communication market division of the communications network.

5. The method of claim 3, wherein the quantity is determined in real-time based, at least in part, on a period of time up to the current moment.

6. The method of claim 1, wherein detecting the event is based, at least in part, on data obtained external to the communications network.

7. The method of claim 6, wherein the data obtained external to the communications network includes at least one of power outage alert, fire alert, severe weather alert, or natural disaster alert.

8. The method of claim 1, wherein determining the real-time status of the subset of the plurality of cell sites comprises causing active probing of at least one cell site of the subset.

9. A network downtime determination system, comprising:
  at least one memory that stores computer executable instructions; and at least one processor that executes the computer executable instructions to cause actions to be performed, the actions including:

detecting an event that triggers update of a downtime accumulation estimate associated with a cellular communications network including a plurality of cell sites, based on a quantity of malfunction messages exchanged or relayed via the cellular communications network during a period of time up to a current moment;

identifying a subset of the plurality of cell sites that is potentially affected by the event based, at least in part, on a measure of proximity to the event, wherein the proximity is based on at least one of a spatial distance or network distance;

determining real-time status of the subset of the plurality of cell sites that is potentially affected by the event;

updating the downtime accumulation estimate based, at least in part, on the realtime status of the subset;

comparing the updated downtime accumulation estimate with one or more reporting criteria; and responsive to a positive result from the comparing, transmitting the updated downtime accumulation estimate to a remote system and resetting the downtime accumulation estimate.

10. The system of claim 9, wherein the actions further comprise determining real-time status of all of the plurality of cell sites.

11. The system of claim 10, wherein the determining of real-time status of all of the plurality of cell sites is performed independently from the determining of real-time status of the subset of cell sites.

12. The system of claim 10, wherein the actions further comprise consolidating the real-time status of all of the plurality of cell sites with the downtime accumulation estimate to determine updated downtime accumulation.

13. The system of claim 12, wherein the actions further comprise comparing the updated downtime accumulation with the one or more reporting criteria.

14. The system of claim 13, wherein the actions further comprise responsive to a positive result from the comparing of the updated downtime accumulation with the one or more criteria, transmitting the updated downtime accumulation to the remote system.

15. A non-transitory computer-readable medium storing contents that, when executed by one or more processors, cause the one or more processors to perform actions comprising:

detecting an event that triggers update of a downtime accumulation estimate associated with a cellular communications network including a plurality of cell sites, based on a quantity of malfunction messages exchanged or relayed via the cellular communications network during a period of time up to the current moment;

determining real-time status of a subset of the plurality of cell sites that is potentially affected by the event, wherein the subset is identified based on its geographic proximity to the detected event;

updating the downtime accumulation estimate based, at least in part, on the real-time status of the subset;

comparing the updated downtime accumulation estimate with one or more reporting criteria; and responsive to a positive result from the comparing, causing transmitting of the updated downtime accumulation estimate to a remote system and resetting the downtime accumulation estimate.

16. The computer-readable medium of claim 15, wherein detecting the event is based on at least one of a geographic concentration, network topology-based concentration, or communication market division of the communications network.

17. The computer-readable medium of claim 15, wherein detecting the event is based, at least in part, on a period of time up to the current moment.

18. The computer-readable medium of claim 15, wherein the actions further comprise:

determining real-time status of all of the plurality of cell sites independently from the determining of real-time status of the subset of cell sites;

consolidating the real-time status of all of the plurality of cell sites with the downtime accumulation estimate to determine updated downtime accumulation;

comparing the updated downtime accumulation with the one or more reporting criteria; and responsive to a positive result from the comparing of the updated downtime accumulation with the one or more criteria, causing transmitting of the updated downtime accumulation to the remote system.

* * * * *